United States Patent
Wilcox

(10) Patent No.: US 6,882,836 B2
(45) Date of Patent: Apr. 19, 2005

(54) GAIT ANTENNA INTERFACE WITH SPECIAL ISOLATION MODE

(75) Inventor: Bruce Wilcox, Cary, NC (US)

(73) Assignee: Ericsson, Inc., Research Triangle Park, NC (US)

( * ) Notice: Subject to any disclaimer, the term of this patent is extended or adjusted under 35 U.S.C. 154(b) by 462 days.

(21) Appl. No.: 10/196,037

(22) Filed: Jul. 16, 2002

(65) Prior Publication Data

US 2004/0198291 A1 Oct. 7, 2004

(51) Int. Cl.[7] .................................................. H04B 1/10
(52) U.S. Cl. ........................ 455/271; 455/78; 455/114.2
(58) Field of Search ................................ 455/271, 269, 455/275, 277.1, 280, 300, 307, 334, 78, 80, 82, 81, 83, 552.1, 560, 570, 114.2, 168.1

(56) References Cited

U.S. PATENT DOCUMENTS 6,243,566 B1    6/2001    Peckham et al.

FOREIGN PATENT DOCUMENTS

| EP | 0980109 | 2/2000 |
|---|---|---|
| EP | 1089446 | 4/2001 |
| JP | 2000-013280 | 1/2000 |
| WO | WO 99/62195 | 12/1999 |

OTHER PUBLICATIONS

Tham et al., "A 2.7–V 900–MHz/1.9–GHz dual–band transceiver IC for digital wireless communication", Conference Article, J. Journal (Mar. 1999).

Werner Wild, Intermodulation Product Second–Order Interferers in Dual Band Systems, Microwave Journal (Sep. 2000) pp. 200–207.

L. F. Fei, A T/R Diversity RF Switch Design Using PIN Diodes, Applied Microwave & Wireless (Oct. 2000) (Abstract Only).

M. Faulkner, "IM2 Removal in Direct Conversion Receivers", IEEE VTS 53rd Vehicular Technology Conference, Rhodes, Greece (May 2001) (Abstract Only).

*Primary Examiner*—Edward F. Urban
*Assistant Examiner*—Thuan T. Nguyen
(74) *Attorney, Agent, or Firm*—Moore & Van Allen PLLC; Gregory A. Stephens

(57) ABSTRACT

A system and method for suppressing spurious signal leakage in a mobile terminal antenna interface without degrading switch linearity or system insertion loss is disclosed. The antenna interface includes an antenna port, a receive port, a transmit port, and a plurality of switch modes, that may include a receive mode, a transmit mode, and a special isolation mode. To suppress spurious signal leakage from high band transmit and receive ports, a switching mechanism is employed to isolate the receive port from the antenna port in high band transmit mode, and to isolate the transmit port from the antenna port in high band receive mode. A special isolation mode allows simultaneous isolation of the high band transmit and receive ports from the antenna port in low band transmit and receive modes. DC current control circuitry is optionally employed to reduce current drain in transmit and special isolation modes, extending battery life.

36 Claims, 8 Drawing Sheets

US 6,882,836 B2

GAIT ANTENNA INTERFACE WITH SPECIAL ISOLATION MODE

BACKGROUND OF THE INVENTION

Several acronyms are used throughout the text and are presented in TABLE 1 below for ease of reference.

TABLE 1

| ACRONYM | DEFINITION |
| --- | --- |
| AMPS | Advanced Mobile Phone Service |
| ANT | Antenna |
| ASIC | Application-Specific Integrated Circuit |
| BJT | Bipolar Junction Transistor |
| DAMPS | Digital Advanced Mobile Phone Service (see TDMA) |
| EDGE | Enhanced Data-rates for GSM/Global Evolution |
| FCC | Federal Communications Commission |
| FET | Field-Effect Transistor |
| GAIT | GSM ANSI-136 Interoperability Team |
| GPRS | General Packet Radio Service |
| GSM | Global System for Mobile communications |
| HB | High Band |
| LB | Low Band |
| LNA | Low Noise Amplifier |
| LO | Local Oscillator |
| PHEMT | Pseudomorphic High Electron Mobility Transistor |
| PIN | P-type-Insulator-N-type |
| RF | Radio Frequency |
| RX | Receive |
| SPDT | Single-Pole Double-Throw |
| TDMA | Time Division/Domain Multiple Access (see DAMPS) |
| T/R | Transmit/Receive Switch |
| TX | Transmit |
| VCO | Voltage-Controlled Oscillator |

GAIT (GSM ANSI-136 Interoperability Team) is a telecommunications industry working group whose mission is to develop standards to facilitate mobile terminal (i.e. cell phone) roaming among different mobile network technologies. GAIT mobile terminals are dual-band, tri-mode devices that allow users to roam on different network technologies using the same mobile terminal. GAIT mobile terminals can operate in AMPS, TDMA/DAMPS and GSM/GPRS modes in the 850 MHz band, and in TDMA/DAMPS or GSM/GPRS modes in the 1900 MHz band. DAMPS and TDMA refer to the same air interface standard.

The FCC promulgates standards with respect to spurious output signals emitted from mobile terminals. Spurious signal leakage is a form of radio frequency (RF) interference that occurs when signals other than the desired signal escape through a mobile terminal antenna port. The FCC standards ensure that unacceptable levels of RF interference are not emitted from a mobile terminal. As antenna interface switching within a mobile terminal becomes more complex (i.e. includes a greater number of ports), suppression of spurious output signals becomes increasingly difficult.

TDMA/DAMPS based prior art typically addressed spurious signal leakage problems by selectively placing a FET based switching system in a state that will suppress the spurious signal amplitude. Given a system with an RX to ANT isolation issue, the prior art solution would set the switch in a TX to ANT mode. This action isolates the RX and ANT ports but effectively closes the TX to ANT path. Simultaneous TX to ANT and RX to ANT isolation, however, was not achieved. In addition to isolation issues, linearity is also a concern. TDMA/DAMPS based prior art methods are unsatisfactory in a superheterodyne receiver-based GAIT mobile terminal, because the GSM TX mode has significantly higher harmonic suppression requirements than does TDMA/DAMPS, and thus requires superior switch linearity. Yet, present FET based switch systems do not have the required linearity margin.

What is needed is a system and method of suppressing spurious output signals without the usual system insertion loss or linearity issues.

SUMMARY

The present invention is a system and method of suppressing spurious output signals in a mobile terminal, without significantly degrading switch linearity or system insertion loss in the mobile terminal within the mobile terminal, there is an antenna interface that includes an antenna port, a receive port, a transmit port. The present invention further includes a plurality of switch modes such as a receive mode, a transmit mode, and a special isolation mode. To suppress spurious signal leakage from the high band transmit port and receive port, a switching mechanism is employed to isolate the receive port from the antenna port while the mobile terminal is in high band transmit mode. The switching mechanism is similarly used to isolate the transmit port from the antenna port while the mobile terminal is in high band receive mode. A special isolation mode allows simultaneous isolation of the high band transmit and receive ports from the antenna port while the mobile terminal is in low band transmit and receive modes. As an additional feature, DC current control circuitry can be optionally employed to reduce the current drain while the mobile terminal is in transmit and/or special isolation modes, thereby extending battery life.

DETAILED DESCRIPTION OF THE INVENTION

Figure 1:
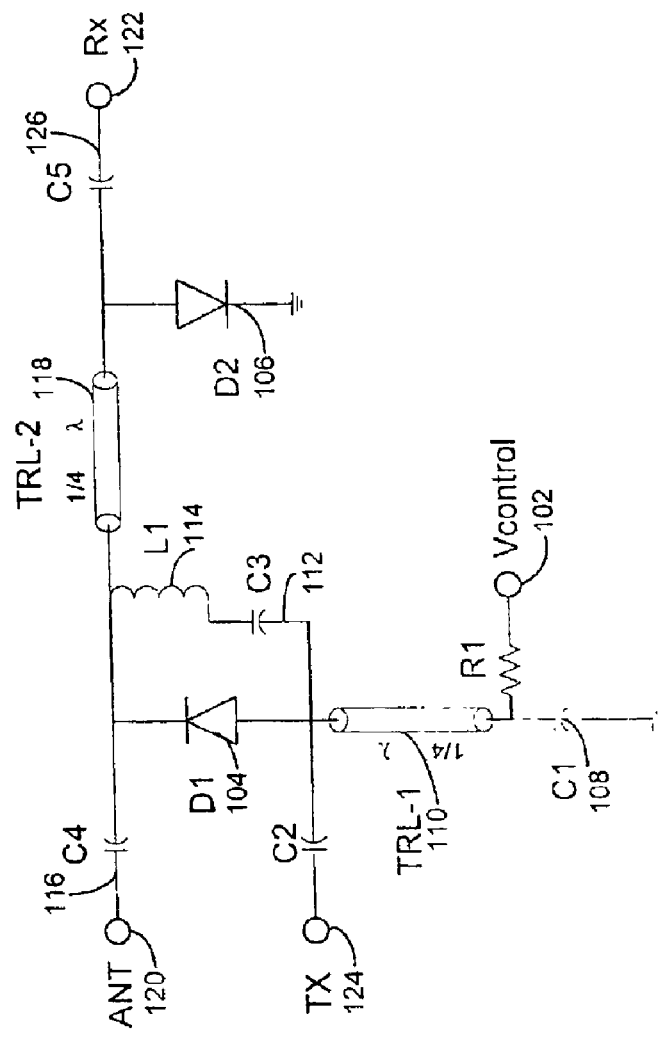
FIG. 1 illustrates a prior art GSM PIN diode single-pole double-throw T/R switch.

In a typical TDMA/DAMPS dual band antenna interface system within a mobile terminal, the high band switch is a FET or PHEMT device, while the low band section is a duplexer. A typical TDMA/DAMPS receiver architecture includes a superheterodyne receiver and a low band (LB) voltage controlled oscillator (VCO)/high band (HB) local oscillator doubler. With such an architecture, low band operation (850 MHz) may allow spurious high band (1900 MHz) local oscillator (LO) signals to escape or "leak" via the antenna interface high band transmit (TX) and/or receive (RX) ports. The most likely spurious signal leakage path during low band operation leads from the high band RX port to the antenna port.

While operating in low band mode, the TDMA/DAMPS prior art solution was to place the high band switch in the transmit mode, effectively isolating the high band RX to ANT path and attenuating any conducted spurious output signals from the high band RX port. However, this solution presents two problems. First, any spurious signals at the TX port will transfer to the antenna port, making circuit board layout critical. This problem exists when the prior art solution is applied to any TDMA/DAMPS receiver architecture (superheterodyne receiver and a low band VCO/high band local oscillator doubler).

The second problem is specific to GAIT mobile terminals (i.e. TDMA/DAMPS and GSM combined into a single mobile terminal). GSM terminals can not use FET or PHEMT devices for the high band switch, because GSM has more stringent transmitter harmonic suppression requirements than TDMA/DAMPS. Therefore, GSM switches utilize a PIN diode based antenna interface. PIN diodes exhibit superior linearity in comparison to FET or PHEMT switch types, which is important for controlling TX harmonic levels. Thus, the TDMA/DAMPS prior art solution is not feasible in a GAIT mobile terminal. Further, PIN diodes require 8–10 mA of DC current in transmit mode. Throwing the high band switch into TX mode during low band operation significantly reduces the low band mode battery life of the mobile terminal.

The present invention overcomes prior art deficiencies and facilitates the integration of a TDMA/DAMPS receiver architecture into a modified GSM antenna interface. Prior art GSM type architectures typically do not use a LB VCO/HB doubler, and thus do not have the problem of the 850 MHz signal leakage from the high band RX path. Since a GAIT terminal must operate in a GSM mode as well as a TDMA/DAMPS mode, combining the GSM PIN diode antenna interface with a TDMA/DAMPS type receiver is an economical solution. However, this results in the spurious signal emissions discussed above.

The FCC limits spurious emission levels in the 1900 MHz band to a signal amplitude of –57 dBm at the antenna. If the worst case antenna interface to high band LNA input port insertion loss is 2 dB, the spurious signal at the high band LNA input must be no higher than –55 dBm. If the maximum low band VCO input level is +1 dBm, the total low band VCO input to high band LNA input isolation requirement is 56 dB, which is difficult to achieve with present ASIC technology and will worsen as ASIC die sizes decrease. When operating a mobile terminal at approximately 2 GHz, 40 dB of ASIC isolation is typical. The ASIC isolation is limited by substrate leakage and finite circuit to circuit isolation. Thus, the antenna interface must provide at least 16 dB of isolation help to achieve the 56 dB LNA input isolation goal.

A typical prior art GSM PIN diode SPDT (single-pole double-throw) switch used for suppressing spurious signal leakage is shown in FIG. 1. When $V_{control}$ 102 is low, the PIN diode switch circuitry is in receive mode. The PIN diodes D1 104 and D2 106 are off; therefore zero DC bias current flows through the PIN diode switch. In the off state, the PIN diode equivalent model is a high value resistance in parallel with a shunt capacitance. Capacitor C1 108, transmission line TRL-1 110, capacitor C3 112, inductor L1 114, and D1 104 appear as a high-impedance circuit at the network junction of C4 116, L1 114, and TRL-2 118. This allows signals to travel from the ANT 120 port to the RX port 122 with minimum attenuation, while maintaining a high level of TX port 124 to ANT port 122 isolation help, on the order of 20–25 dB.

When $V_{control}$ 102 is high, the PIN diode switch circuitry is in transmit mode. The PIN diodes D1 104 and D2 106 are on, and approximately 8 mA of current is required to satisfy the GSM mode linearity requirements. In this state, the PIN diode equivalent model appears as an inductance in series with a low value resistance. Thus, the network junction of TRL-2 118, C5 126, and D2 106 is a short. Since the TRL-2 transmission line 118 is a quarter wavelength at the frequency of operation, the path from TRL-2 118 to ground appears to be a very high impedance from the TX perspective. This allows signals to travel from the TX port 124 to the ANT port 120 with minimum attenuation, while maintaining high ANT port 120 to RX port 122 isolation help (20–25 dB).

Thus, the prior art GSM/PIN diode switch solution may be used to isolate the high band RX to ANT path and attenuate the spurious output signals in a GAIT mobile terminal. However, board layout is critical with this solution, as any spurious signals at the TX port will still transfer to the antenna port. The problem is that first-generation GAIT mobile terminals will look like a marriage of two separate architectures (GSM and TDMA/DAMPS), making board layout very dense and increasing the probability of multiple leakage paths. Another problem is the increased DC current necessitated by the use of PIN diodes, which significantly reduces low band battery life.

The present invention addresses both of these problems in GAIT mobile terminals. The present invention comprises three main circuit elements: PIN diode switch circuitry 202, isolation block circuitry 204, and DC current control block circuitry 206.

Figure 2:
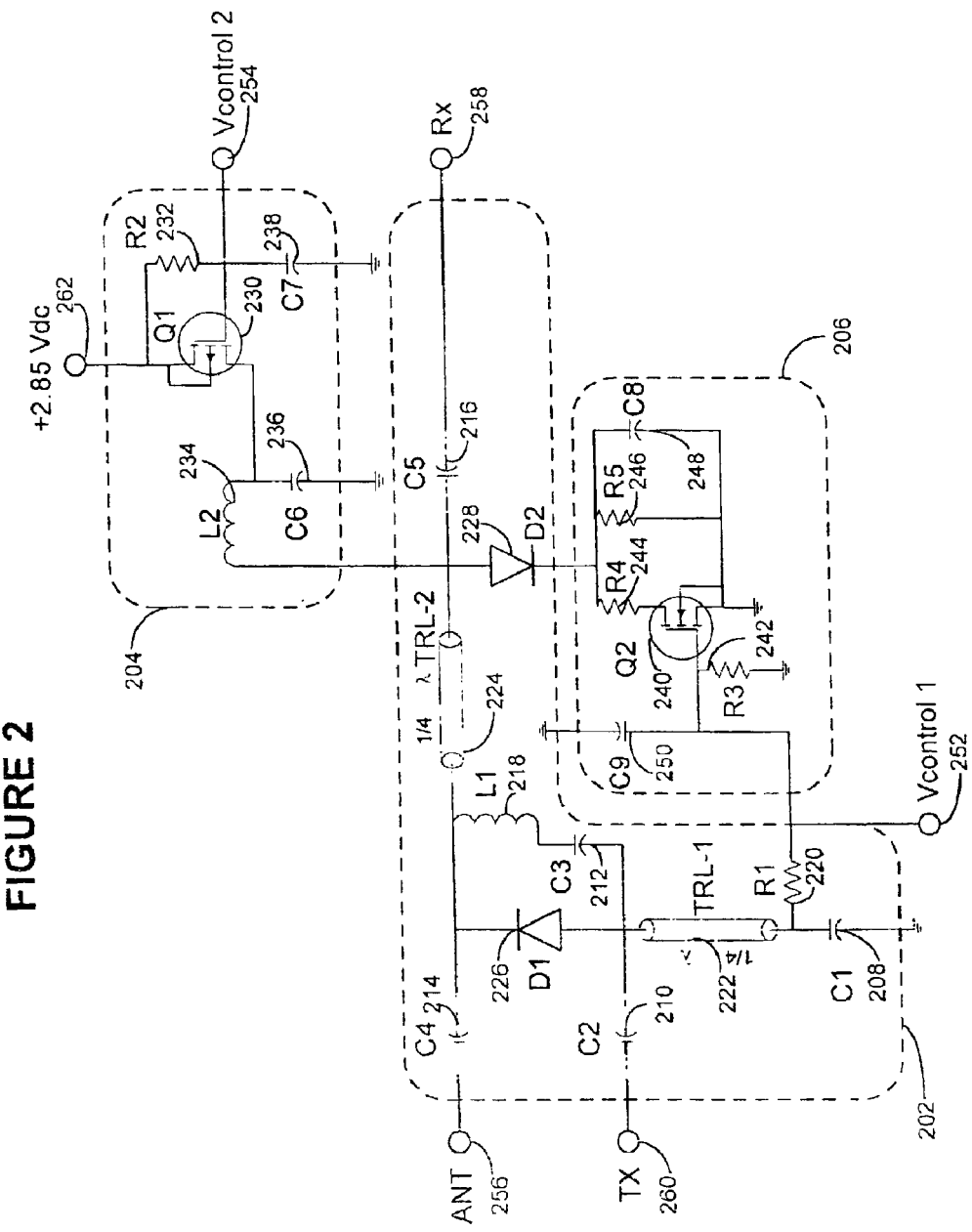
FIG. 2 illustrates PIN diode switch circuitry with special isolation mode circuitry and DC current control circuitry used for suppressing spurious signal leakage in a mobile terminal.

FIG. 2 illustrates one embodiment of the present invention. The PIN diode switch circuitry 202 comprises the following elements: capacitors C1 208, C2 210, C3 212, C4 214, and C5 216, inductor L1 218, resistor R1 220, transmission lines TRL-1 222 and TRL-2 224, and PIN diodes D1 226 and D2 228. The isolation block circuitry 204 comprises the following elements: transistor Q1 230, resistor R2 232, inductor L2 234, and capacitors C6 236 and C7 238. The DC current control block circuitry 206 comprises the following elements: transistor Q2 240, resistors R3 242, R4 244, and R5 246, and capacitors C8 248 and C9 250. An operation mode truth table for FIG. 2 is listed below.

| SWITCH MODE | $V_{control}1$ | $V_{control}2$ |
|---|---|---|
| Receive (RX) | 0 | 1 |
| Transmit (TX) | 1 | 1 |
| Special Isolation | 0 | 0 |

When the mobile terminal is in receive mode, $V_{control}1$ 252, which controls the states of PIN diodes D1 226 and D2 228 and transistor Q2 240, is low and $V_{control}2$ 254, which controls the states of PIN diode D2 228 and transistor Q1 230, is high. Both PIN diodes D1 226 and D2 228 are off. Capacitor C1 208, transmission line TRL-1 222, capacitor C3 212, inductor L1 218, and D1 226 appear as a high-impedance circuit at the network junction of C4 214, L1 218, and TRL-2 224. This allows signals to travel from the ANT port 256 to the RX port 258 with minimum attenuation, while maintaining high TX port 260 to ANT port 256 isolation help (20–25 dB). In this mode, a DC bias condition does not exist. Transistor Q1 230 is an enhancement mode "p" channel FET. When the gate-source voltage for Q1 230 is greater than or equal to 0 $V_{dc}$ (i.e. when $V_{control}2$ 254 is high), Q1 230 is off, allowing only miniscule amounts of leakage current to flow. Transistor Q2 240 is also off. The DC current return path is through D2 228 and R5 246. As the D2 228 leakage current increases, the RX path insertion loss similarly increases. Because the base leakage current in a bipolar transistor device (BJT) is relatively high in comparison to a FET, a BJT is not suitable for Q1 230.

When the mobile terminal is in transmit mode, $V_{control}1$ 252 is high and $V_{control}2$ 254 is high. Both PIN diodes D1 226 and D2 228 are on. Since the TRL-2 transmission line 224 is a quarter wavelength at the frequency of operation, the path from TRL-2 224 to ground (through D2 228) appears to be a very high impedance from the TX perspective. This allows signals to travel from the TX port 260 to the ANT port 256 with minimum attenuation, while maintaining high ANT port 256 to RX port 258 isolation help (20–25 dB). Transistor Q2 240 is an enhancement mode "n" channel FET. When the gate-source voltage for Q2 240 is greater than or equal to 0 $V_{dc}$ (i.e. when $V_{control}1$ 252 is high), the device is on, while Q1 230 is off. This allows the DC current return path to pass through R1 220, TRL-1 222, D1 226, TRL-2 224, D2 228, R4 244, and Q2 240. Since R4 244 is parallel to R5 246 when Q2 240 is on, and R4<<R5, R4 244 sets the TX mode DC current requirement. The isolation block circuitry 204 is also important in TX mode, because if the Q1 230 leakage current is high, the bias current through D1 226 may be split between Q1 230 (through L2 234) and D2 228. This would result in a low D2 is 228 bias current condition, causing higher TX path loss, increased levels of TX harmonics, and reduced ANT port 256 to RX port 258 isolation help in TX mode. This is another reason why a FET device (as opposed to a bipolar device) is required for Q1 230.

When the mobile terminal is in special isolation mode, $V_{control}1$ 252 is low and $V_{control}2$ is low 254. Thus, Q1 230 is on and Q2 240 is off. Also, PIN diode D1 226 is off and D2 228 is on. Current flows from the DC source 262 through Q1 230, L2 234, D2 228, and returns to ground through R5 246. Thus, R5 246 sets the special isolation mode DC current requirement. The DC current in special isolation mode is typically 2 mA, which is significantly below the 8–10 mA TX mode current requirement in GSM applications. Also, both TX port 260 to ANT port 256 and RX port 258 to ANT port 256 isolation is simultaneously optimized in special isolation mode.

Figure 3:
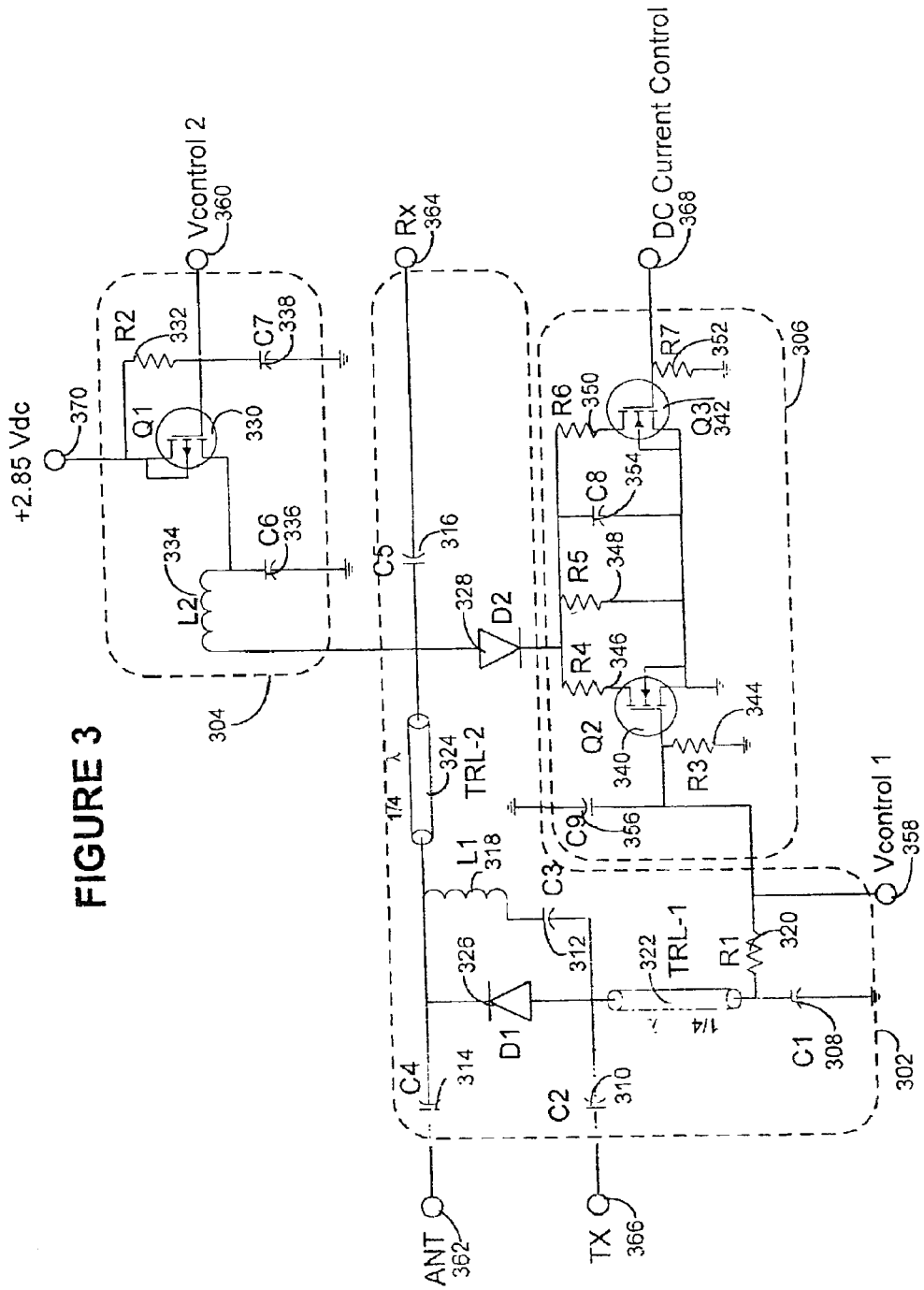
FIG. 3 illustrates PIN diode switch circuitry with special isolation mode circuitry and DC current control circuitry used for suppressing spurious signal leakage and reducing current drain in a mobile terminal.

An alternative embodiment is illustrated in FIG. 3, and is comprised of PIN diode switch circuitry 302, isolation block circuitry 304, and DC current control block circuitry 306. The PIN diode switch circuitry 302 comprises the following elements: capacitors C1 308, C2 310, C3 312, C4 314, and C5 316, inductor L1 318, resistor R1 320, transmission lines TRL-1 322 and TRL-2 324, and PIN diodes D1 326 and D2 328. The isolation block circuitry 304 comprises the following elements: transistor Q1 330, resistor R2 332, inductor L2 334, and capacitors C6 336 and C7 338. The DC current control block circuitry 306 comprises the following elements: transistors Q2 340 and Q3 342, resistors R3 344, R4 346, R5 348, R6 350, and R7 352, and capacitors C8 354, and C9 356. An operation mode truth table for FIG. 3 is listed below.

| SWITCH MODE | $V_{control}1$ | $V_{control}2$ | DC Current Control Input |
|---|---|---|---|
| Receive (RX) | 0 | 1 | 0 |
| Transmit (TX) | 1 | 1 | 0 for low current; 1 for high current |
| Special Isolation | 0 | 0 | 0 |

When the mobile terminal is in receive mode, $V_{control}1$ 358 is low and $V_{control}2$ 360 is high. Both PIN diodes D1 326 and D2 328 are off. Capacitor C1 308, TRL-1 322, C3 312, L1 318, and D1 326 appear as a high-impedance circuit at the network junction of C4 314, L1 318, and TRL-2 324. This allows signals to travel from the ANT port 362 to the RX port 364 with minimum attenuation, while maintaining high TX port 366 to ANT port 362 isolation help (20–25 dB). In receive mode, a DC bias condition does not exist.

When the mobile terminal is in transmit mode, $V_{control}1$ 358 is high and $V_{Control}2$ 360 is high. Both PIN diodes D1 326 and D2 328 are on. Since the TRL-2 transmission line 324 is a quarter wavelength at the frequency of operation, the path from TRL-2 324 to ground appears to be a very high impedance from the TX perspective. This allows signals to travel from the TX port 366 to the ANT port 362 with minimum attenuation, while maintaining high ANT port 362 to RX port 364 isolation help (20–25 dB). DC current flows through TRL-2 324 and D2 326, and returns to ground through the current control block circuitry 306. The DC current control input 368 allows multiple transmit mode DC current states. A "low" at DC current control input 368 will bias the D1 PIN diode 326 in a low current TX mode. This selection trades off linearity for lower DC current. The DC current is typically lowered to 5 mA, which is significantly below the 8–10 mA transmit mode current requirement in GSM applications. Likewise, a "high" at the DC current control input 368 will bias the D1 PIN diode 326 in a high current mode. The linearity will improve at the expense of increased DC current.

When the mobile terminal is in special isolation mode, $V_{control}1$ 358 is low and $V_{control}2$ 360 is low. PIN diode D1 326 is off and D2 328 is on. Current flows from the DC source 370 through the isolation block circuitry 304 and D2 328, and returns to ground through the DC current control block circuitry 306. The DC current control input 368 is "low" in this mode to lower the DC current and extend battery life. Also, both TX port 366 to ANT port 362 and RX port 364 to ANT port 362 isolation is simultaneously optimized in special isolation mode.

Figure 4:
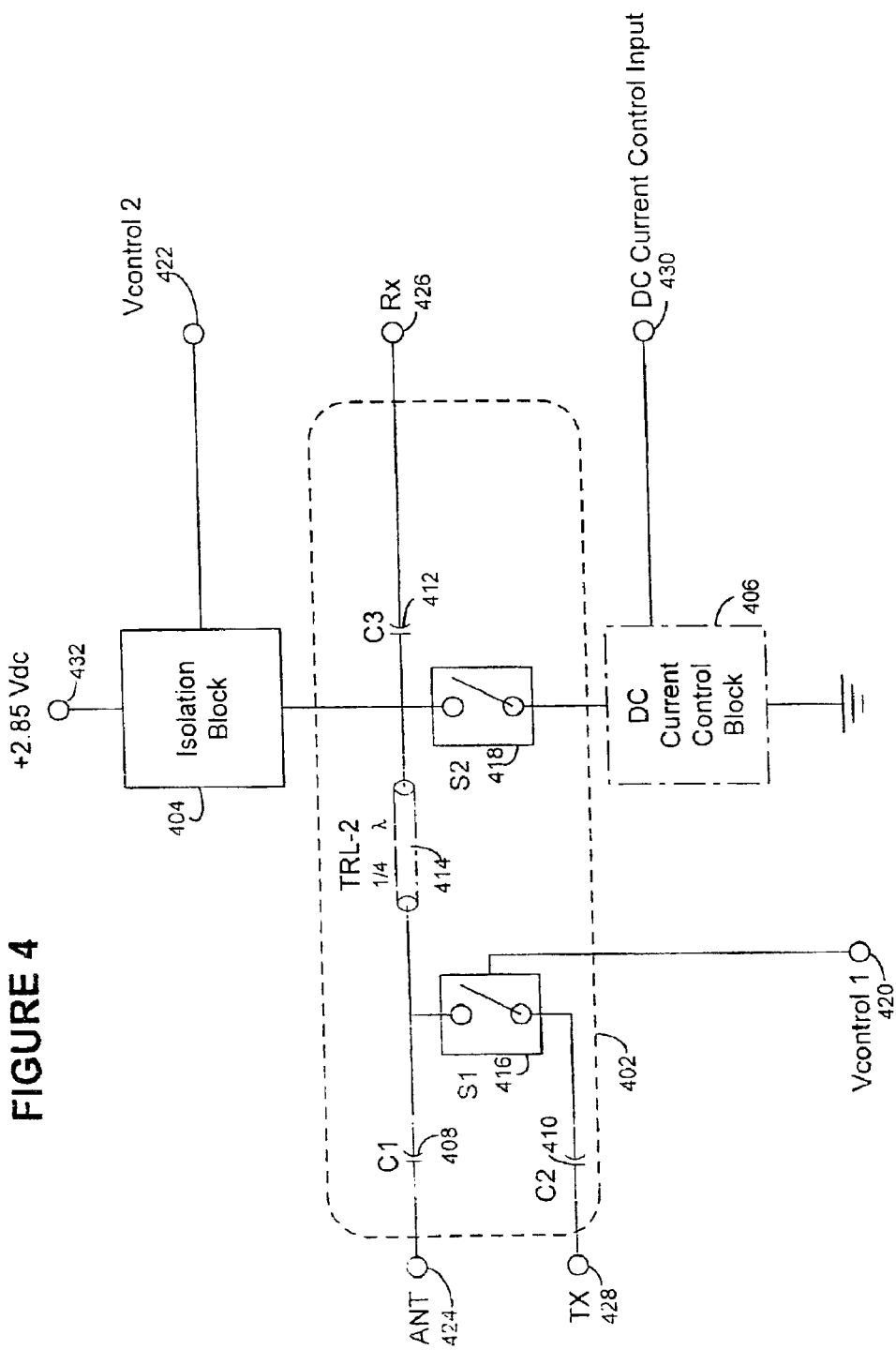
FIG. 4 illustrates a block diagram of PIN diode switch circuitry with special isolation mode circuitry and optional DC current control circuitry used for suppressing spurious signal leakage and reducing current drain in a mobile terminal.

Another alternative embodiment is illustrated in FIG. 4, and is comprised of a PIN diode switch circuitry 402, isolation block circuitry 404, and DC current control block circuitry 406. The PIN diode switch circuitry 402 comprises the following elements: capacitors C1 408, C2 410, and C3 412, transmission line TRL-2 414, and PIN diodes S1 416 and S2 418. The isolation block circuitry 404 comprises any combination of network elements that function to isolate the RX port from the TX port and the ANT port in special isolation mode. The DC current control block circuitry 406 comprises any combination of network elements that function to select the DC current in transmit mode and limit the DC current in special isolation mode. An operation mode truth table for FIG. 4 is listed below.

| SWITCH MODE | $V_{control}1$ | $V_{control}2$ | DC Current Control Input |
|---|---|---|---|
| Receive (RX) | 0 | 1 | 0 |
| Transmit (TX) | 1 | 1 | 0 for low current; 1 for high current |
| Special Isolation | 0 | 0 | 0 |

When the mobile terminal is in receive mode, $V_{control}1$ 420 is low and $V_{control}2$ 422 is high. Both PIN diodes S1 416 and S2 418 are off. This allows signals to travel from the ANT port 424 to the RX port 426 with minimum attenuation, while maintaining high TX port 428 to ANT port 424 isolation help (20–25 dB). A DC bias condition does not exist in receive mode.

When the mobile terminal is in transmit mode, $V_{control}1$ 420 is high and $V_{control}2$ 422 is high. Both PIN diodes S1 416 and S2 418 are on. Since the TRL-2 transmission line 414 is a quarter wavelength at the frequency of operation, the path from TRL-2 414 to ground (through S2 418 and the current control block 406) appears to be a very high impedance from the TX perspective. This allows signals to travel from the TX port 428 to the ANT port 424 with minimum attenuation, while maintaining high ANT port 424 to RX port 426 isolation help (20–25 dB). DC current flows through TRL-2 414 and S2 418, and returns to ground through the current control block circuitry 406. The DC current control input 430 allows multiple transmit mode DC current states. A "low" at DC current control input 430 will bias the S1 PIN diode 416 in a low current mode. This selection trades off linearity for lower DC current. The DC current is typically lowered to 5 mA, which is significantly below the 8–10 mA transmit mode current requirement in GSM applications. Likewise, a "high" at the DC current control input 430 will bias the S1 PIN diode 416 in a high current mode. The linearity will improve at the expense of increased DC current. Note that the DC current control block circuitry 406 is optional in this embodiment; it may be deleted entirely if current savings are not desired.

When the mobile terminal is in special isolation mode, $V_{control}1$ 420 is low and $V_{control}2$ 422 is low. PIN diode S1 416 is off and S2 418 is on. Current flows from the DC source 432 through the isolation block circuitry 404 and S2 418, and returns to ground through the (optional) DC current control block circuitry 406. The DC current control input 430 is "low" in this mode to lower the DC current and extend battery life. Also, both TX port 428 to ANT port 424 and RX port 426 to ANT port 424 isolation is simultaneously optimized in special isolation mode.

Figure 5:
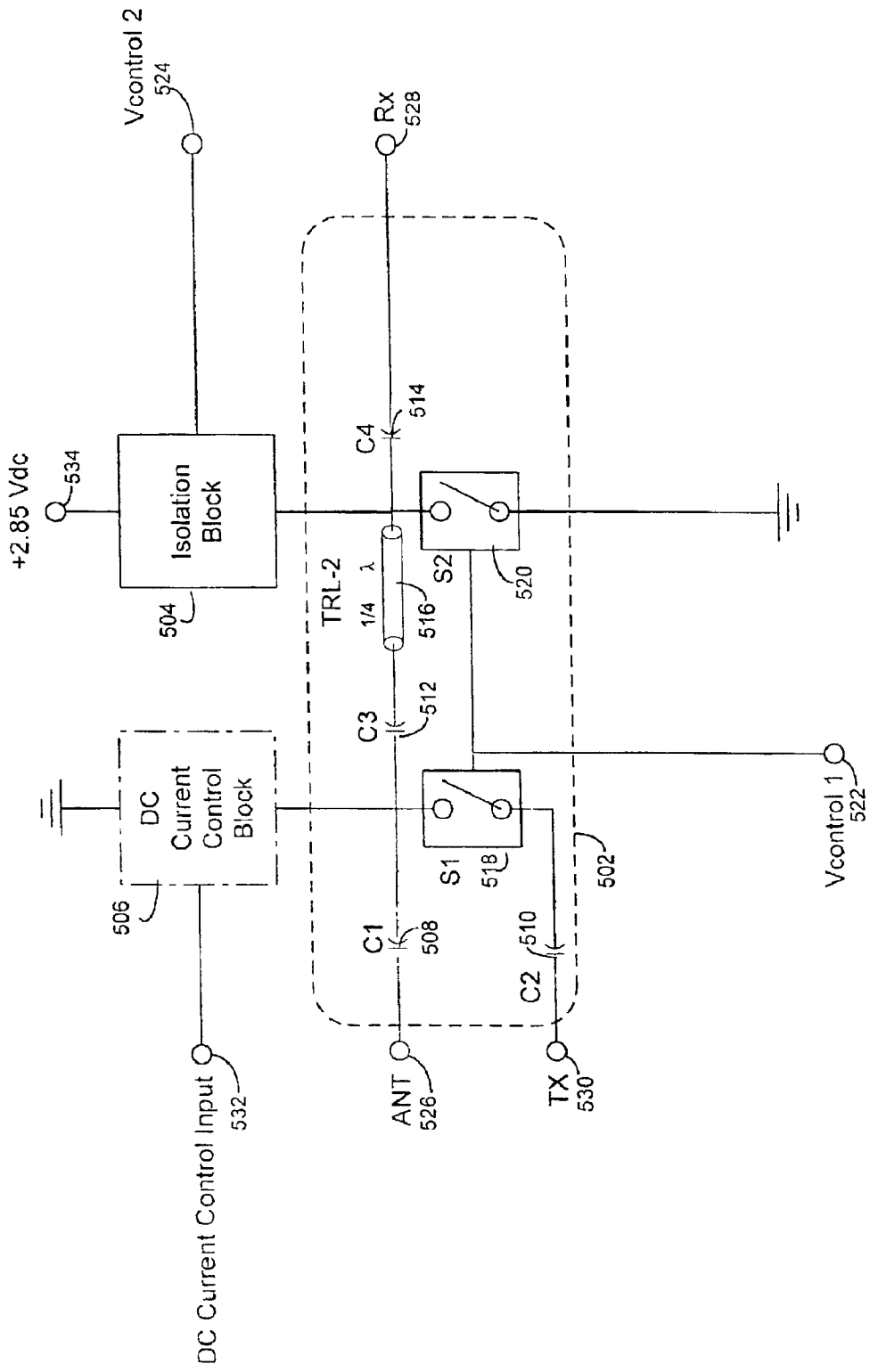
FIG. 5 illustrates a block diagram of hybrid PIN diode and FET switch circuitry with special isolation mode circuitry and optional DC current control circuitry used for suppressing spurious signal leakage and reducing current drain in a mobile terminal.

Another embodiment of the invention is illustrated in FIG. 5, and is comprised of SPDT switch circuitry 502, isolation block circuitry 504, and optional DC current control block circuitry 506. This embodiment combines the prior art PIN diode solution with traditional transistor based switching to form a "hybrid" solution. The SPDT switch circuitry 502 comprises the following elements: capacitors C1 508, C2 510, C3 512, and C4 514, transmission line TRL-2 516, PIN diode S1 518, and FET S2 520. The isolation block circuitry 504 comprises any combination of network elements that function to isolate the RX port from the TX port and the ANT port in special isolation mode. The DC current control block circuitry 506 comprises any combination of network elements that function to set the DC current in transmit mode. An operation mode truth table for FIG. 5 is listed below.

| SWITCH MODE | $V_{control}1$ | $V_{control}2$ | DC Current Control Input |
|---|---|---|---|
| Receive (RX) | 0 | 1 | 0 |
| Transmit (TX) | 1 | 1 | 0 for low current; 1 for high current |
| Special Isolation | 0 | 0 | 0 |

When the mobile terminal is in receive mode, $V_{control}1$ 522 is low and $V_{control}2$ 524 is high. Both S1 518 and S2 520 are off. This allows signals to travel from the ANT port 526 to the RX port 528 with minimum attenuation, while maintaining high TX port 530 to ANT port 526 isolation help (20–25 dB). A DC bias condition does not exist in receive mode.

When the mobile terminal is in transmit mode, $V_{control}1$ 522 is high and $V_{control}2$ 524 is high. Both S1 518 and S2 520 are on. Since the TRL-2 transmission line 516 is a quarter wavelength at the frequency of operation, the path from TRL-2 516 to ground (through S2 520) appears to be a very high impedance from the TX perspective. This allows signals to travel from the TX port 530 to the ANT port 526 with minimum attenuation, while maintaining high ANT port 526 to RX port 528 isolation help (20–25 dB). DC current flows through S1 518, and returns to ground through the current control block circuitry 506. The DC current control input 532 allows multiple transmit mode DC current states. A "low" at DC current control input 532 will bias the S1 PIN diode 518 in a low current mode. This selection trades off linearity for lower DC current. The DC current is typically lowered to 5 mA, which is significantly below the 8–10 mA transmit mode current requirement in GSM applications. Likewise, a "high" at the DC current control input 532 will bias the S1 PIN diode 518 in a high current mode. The linearity will improve at the expense of increased DC current. Note that the DC current control block 506 is optional in this embodiment; it may be deleted entirely if current savings are not desired.

When the mobile terminal is in special isolation mode, $V_{control}1$ 522 is low and $V_{control}2$ 524 is low. PIN diode S1 518 is off and FET S2 520 is on. Current flows from the DC source 534 through the isolation 504 and returns to ground through S2 520. Also, both TX port 530 to ANT port 526 and RX port 528 to ANT port 526 isolation is simultaneously optimized.

Figure 6:
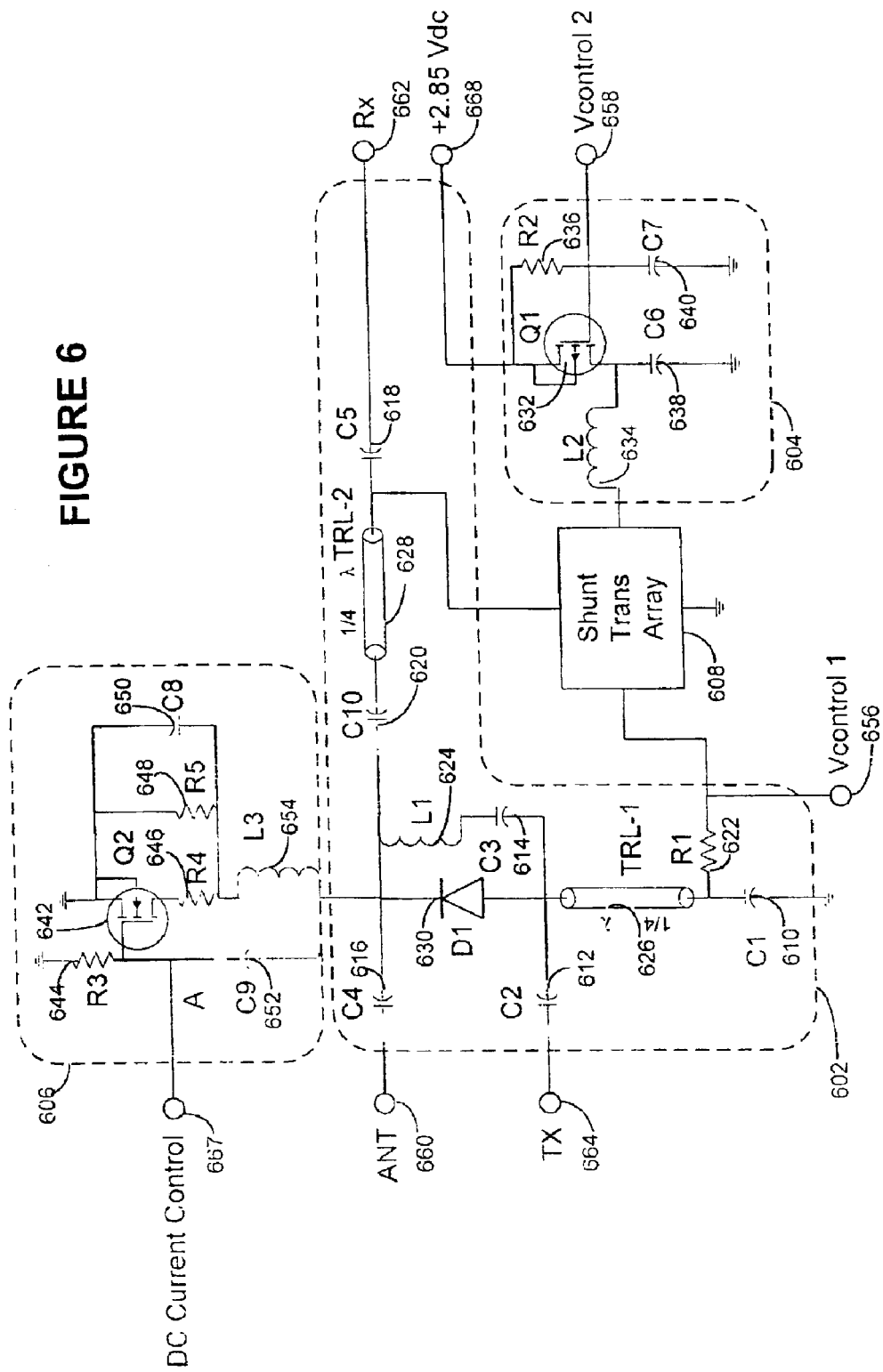
FIG. 6 illustrates hybrid PIN diode and FET switch circuitry with special isolation mode circuitry, DC current control circuitry, and a shunt transistor array, used for suppressing spurious signal leakage and reducing current drain in a mobile terminal.
Figure 7:
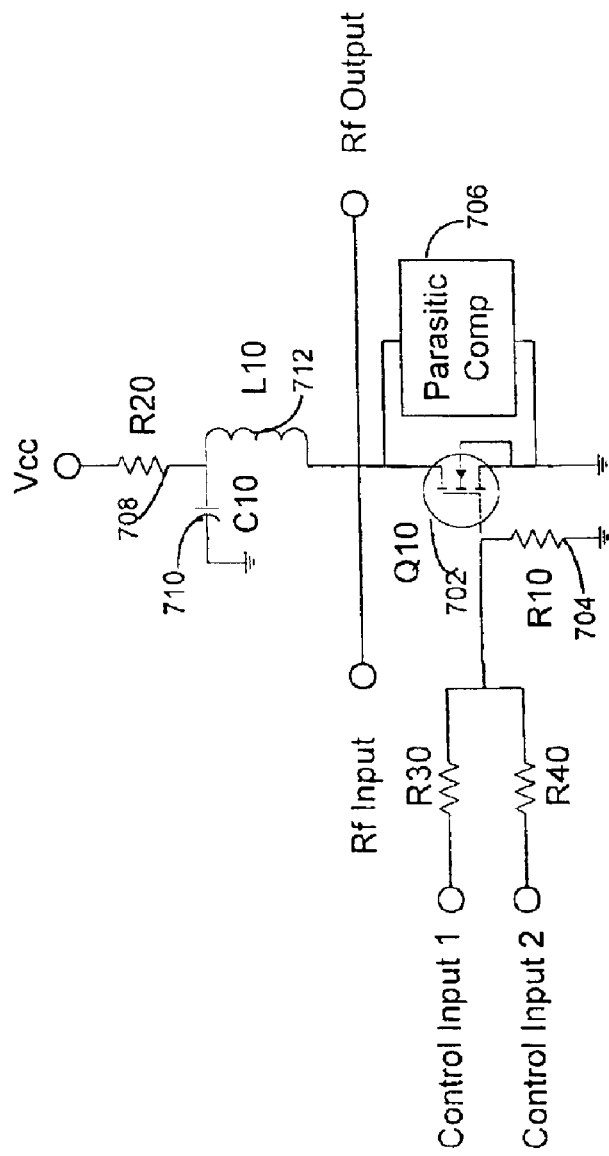
FIG. 7 illustrates one embodiment of a shunt transistor array.

An alternative embodiment of the "hybrid" solution is illustrated in FIG. 6. This embodiment is comprised of SPDT switch circuitry 602, isolation block circuitry 604, DC current control block circuitry 606, and a shunt transistor array 608, which varies the impedance to ground. The SPDT switch circuitry comprises the following elements: capacitors C1 610, C2 612, C3 614, C4 616, C5 618, and C10 620, resistor R1 622, inductor L1 624, transmission lines TRL-1 626 and TRL-2 628, PIN diode D1 630, and the shunt transistor array 608. FIG. 7 illustrates a possible shunt transistor array. Transistor Q10, 702 resistor R10 704, and the "parasitic comp" network 706 define the shunt switching core. Resistor R20 708, capacitor C10 710, and inductor L10 712 are a high RF impedance DC power source.

With respect to FIG. 6, the isolation block circuitry 604 comprises the following elements: transistor Q1 632, inductor L2 634, resistor R2 636, and capacitors C6 638 and C7 640. The DC current control block circuitry 606 comprises the following elements: transistor Q2 642, resistors R3 644, R4 646, and R5 648, capacitors C8 650 and C9 652, and inductor L3 654. An operation mode truth table for FIG. 6 is listed below.

| SWITCH MODE | $V_{control}1$ | $V_{control}2$ | DC Current Control Input |
|---|---|---|---|
| Receive (RX) | 0 | 1 | 0 |
| Transmit (TX) | 1 | 1 | 0 for low current; 1 for high current |
| Special Isolation | 0 | 0 | 0 |

When the mobile terminal is in receive mode, $V_{control}1$ 656 is low and $V_{control}2$ 658 is high. PIN diode D1 630 is off. The shunt transistor array 608 is also "off." In this state, the "parasitic comp network" maximizes the shunt transistor array "off" state impedance. This high impedance allows signals to travel from the ANT port 660 to the RX 662 port with minimum attenuation, while maintaining high TX port 664 to ANT port 660 isolation (20–25 dB). The "off" state impedance maximization is achieved via parallel resonance. In receive mode, a DC bias condition does not exist.

When the mobile terminal is in transmit mode, $V_{control}1$ 656 is high and $V_{control}2$ 658 is high. Both PIN diode D1 630 and the shunt transistor array 608 are "on." In the "on" state, the shunt switching core can be paralleled for lower resistance (multiple devices in parallel), which improves the isolation performance. Since the TRL-2 transmission line 628 is a quarter wavelength at the frequency of operation, the path from TRL-2 628 to ground (through the shunt transistor array 608) appears to be a very high impedance from the TX perspective. This allows signals to travel from the TX port 664 to the ANT port 660 with minimum attenuation, while maintaining high ANT port 660 to RX port 662 isolation help (20–25 dB). DC current returns to ground through R1 622, TRL-1 626, D1 630, L3 654, R4 646, and Q2 642. The DC current control input 667 allows multiple transmit mode DC current states. A "low" at DC current control input 667 will bias the D1 630 PIN diode in a low current mode. This selection trades off linearity for lower DC current. The DC current is typically lowered to 5 mA, which is significantly below the 8–10 mA transmit mode current requirement in GSM applications. Likewise, a "high" at the DC current control input 667 will bias the D1 PIN diode 630 in a high current mode. The linearity will improve at the expense of increased DC current.

When the mobile terminal is in special isolation mode, $V_{control}1$ 656 is low and $V_{control}2$ 658 is low. PIN diode D1 630 is off and the shunt transistor array 608 is "on." In the "on" state, the shunt switching core is paralleled for low resistance to improve isolation. Current flows from the DC source 668 through the isolation block circuitry 604 and returns to ground through the shunt transistor array 608. Also, both TX port 664 to ANT port 660 and RX port 662 to ANT port 660 isolation is simultaneously optimized.

Figure 8:
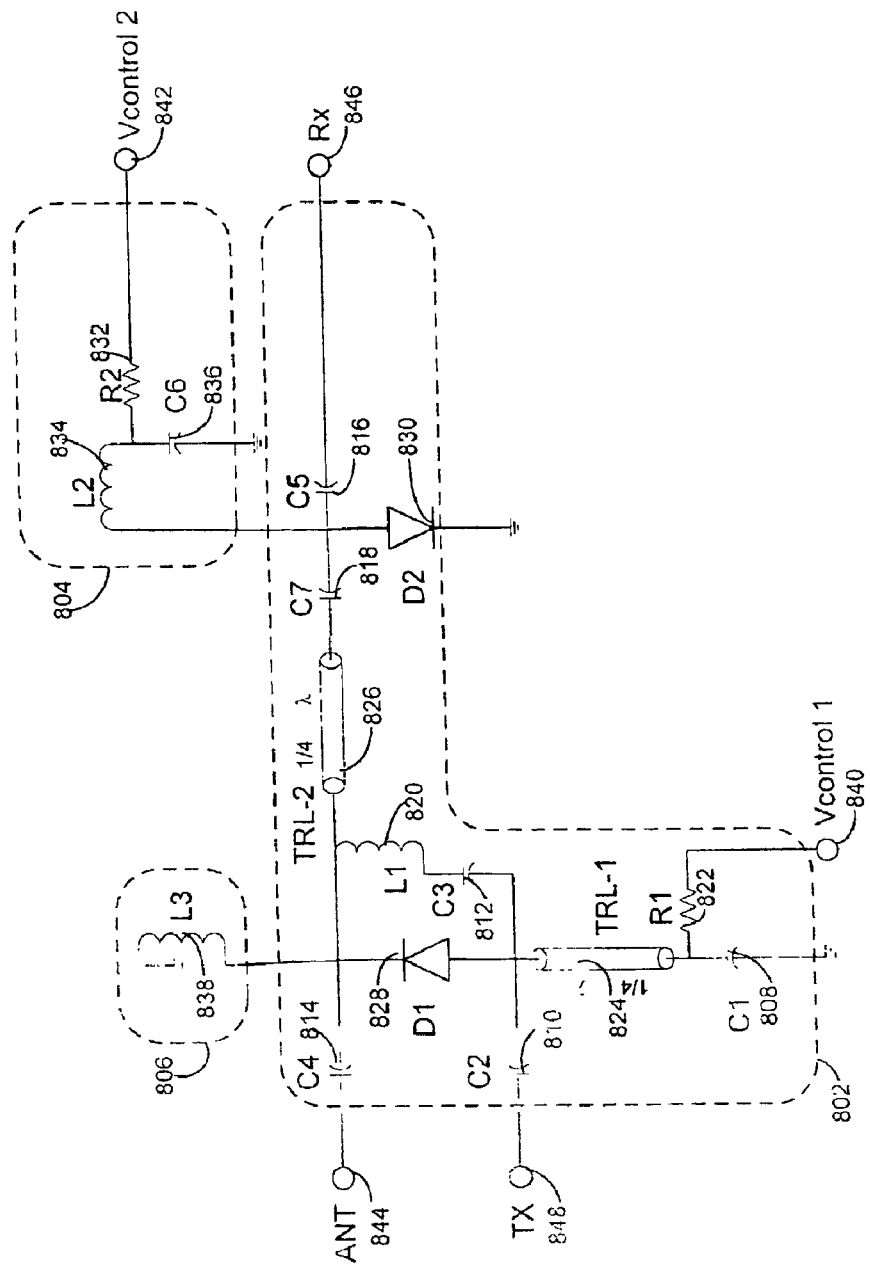
FIG. 8 illustrates PIN diode switch circuitry with alternate special isolation mode circuitry used for suppressing spurious signal leakage in a mobile terminal.

Still another embodiment, with alternate isolation mode circuitry, is illustrated in FIG. 8. This embodiment is comprised of PIN diode switch circuitry 802, an isolation block circuitry 804, and DC current control block circuitry 806. The PIN diode switch circuitry 802 comprises the following elements: capacitors C1 808, C2 810, C3 812, C4 814, C5 816, and C7 818, inductor L1 820, resistor R1 822, transmission lines TRL-1 824 and TRL-2 826, and PIN diodes D1 828 and D2 830. The isolation block circuitry 804 comprises the following elements: resistor R2 832, inductor L2 834, and capacitor C6 836. The DC current control block 806 comprises the following element: inductor L3 838. An operation mode truth table for FIG. 8 is listed below.

| SWITCH MODE | $V_{control}1$ | $V_{control}2$ |
|---|---|---|
| Receive (RX) | 0 | 0 |
| Transmit (TX) | 1 | 1 |
| Special Isolation | 0 | 1 |

When the mobile terminal is in receive mode, $V_{control}1$ 840 is low and $V_{control}2$ 842 is low. A DC bias condition does not exist. Both PIN diodes D1 828 and D2 830 are off. Capacitor C1 808, TRL-1 824, C3 812, L1 820, and D1 828 appear as a high-impedance circuit at the network junction of C4 814, L1 820, and TRL-2 826. This allows signals to travel from the ANT port 844 to the RX port 846 with minimum attenuation, while maintaining high TX port 848 to ANT port 844 isolation help (20–25 dB).

When the mobile terminal is in transmit mode, $V_{control}1$ 840 is high and $V_{control}2$ 842 is high. Both PIN diodes D1 828 and D2 830 are on. Since the TRL-2 transmission line 826 is a quarter wavelength at the frequency of operation, the path from TRL-2 826 to ground (through D2 830) appears to be a very high impedance from the TX perspective. This allows signals to travel from the TX port 848 to the ANT port 844 with minimum attenuation, while maintaining high ANT port 844 to RX port 846 isolation help (20–25 dB). The TX port 848 to ANT port 844 transmission path is essentially a pi network. The series element is D1 828, and the shunt elements (on each side of D1 828) are TRL-1 824 and TRL-2 826 in parallel with L3 838. The D1 828 DC current return path is through L3 838. The D2 830 DC current return path is through ground. It is important to note that a low leakage current source is required to drive $V_{control}2$ 842. A low leakage current source is required to both minimize RX mode ANT port 844 to RX port 846 insertion loss and maximize the TX Port 848 to ANT port 844 linearity.

When the mobile terminal is in special isolation mode, $V_{control}1$ 840 is low and $V_{control}2$ 842 is high. PIN diode D1 828 is off and D2 830 is on. Current flows though R2 832 and L2 834, and returns to ground through D2 830. Thus, both TX port 848 to ANT port 844 and RX port 846 to ANT port 844 isolation is simultaneously optimized.

The foregoing description and embodiments may be applied generically to any terminal that uses a superheterodyne receiver and a LB VCO/HB LO doubler source. Thus, the present invention is not necessarily limited to GAIT mobile terminals. It should be understood that the principles of the present invention may be applied to any cellular or wireless system utilizing other air interfaces, such as TDMA. It should be further understood that the principles of the present invention may be utilized in hybrid systems that are a combination of one or more of the above air interfaces.

In addition, the circuit elements described herein are not limited to a particular method of circuit board mounting. The present invention may be implemented by mounting the circuit elements on a bare printed circuit board, or may be implemented as a module on any suitable substrate material. Substrate materials may include any electromechanical support substance for an integrated circuit.

While the present invention is described herein in the context of a mobile terminal, the term "mobile terminal" may include a cellular radiotelephone with or without a multi-line display; a Personal Communications System (PCS) terminal that may combine a cellular telephone with data processing, facsimile and data communications capabilities; a Personal Digital Assistant (PDA) that can include a radiotelephone, pager, Internet/intranet access, Web browser, organizer, calendar and/or a global positioning system (GPS) receiver; and a conventional laptop and/or palmtop receiver or other computer system that includes a display for GUI. Mobile terminals may also be referred to as "pervasive computing" devices.

Further, specific embodiments of the present invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for" are not intended to be read as means-plus-function elements, even if the claim otherwise includes the word "means".

What is claimed is:

1. In a mobile terminal that can operate in both GSM and DAMPS, a method of suppressing spurious signal leakage in an antenna interface having an antenna port, a receive port, a transmit port, and powered by a DC source, said method comprising:
   isolating the transmit port from the antenna port in a receive mode using a switch means to block any spurious signals in the transmit port from leaking through the antenna port;
   isolating the receive port from the antenna port in a transmit mode using the switch means to block any spurious signals in the receive port from leaking through the antenna port; and
   isolating the receive port and the transmit port from the antenna port in an isolation mode using the switch means to block any spurious signals in the receive port and the transmit port from leaking through the antenna port.

2. The method of claim 1 wherein the switch means is comprised of PIN diodes.

3. The method of claim 2 further comprising minimizing DC current when the mobile terminal is operating in the transmit mode of GSM using a DC current control block coupled with the switch means.

4. The method of claim 3 further comprising minimizing DC current when the mobile terminal is operating in the isolation mode of GSM using the DC current control block coupled with the switch means.

5. The method of claim 1 wherein the switch means is comprised of PIN diodes and FET transistors.

6. The method of claim 5 further comprising minimizing DC current when the mobile terminal is operating in the transmit mode of GSM using a DC current control block coupled with the switch means.

7. The method of claim 6 further comprising minimizing DC current when the mobile terminal is operating in the isolation mode of GSM using the DC current control block coupled with the switch means.

8. The method of claim 1 wherein the switch means is comprised of a PIN diode and a shunt transistor array.

9. The method of claim 8 further comprising minimizing DC current when the mobile terminal is operating in the transmit mode of GSM using a DC current control block coupled with the switch means.

10. The method of claim 9 further comprising minimizing DC current when the mobile terminal is operating in the isolation mode of GSM using the DC current control block coupled with the switch means.

11. The method of claim 1 wherein the switch means is mounted on a printed circuit board.

12. The method of claim 1 wherein the switch means is mounted as a module on a suitable substrate material.

13. A GSM/DAMPS antenna interface device for suppressing spurious signal leakage, said device having an antenna port, a receive port, and a transmit port, and powered by a DC source, said device comprising:
   a switch, for switching between a transmit mode and a receive mode based on controlled input; and
   an isolation block coupled with said switch, that allows said switch to further switch to an isolation mode, such that any spurious signals in the receive port and the transmit port are suppressed from leaking out of the antenna port.

14. The device of claim 13 wherein said switch is comprised of PIN diodes.

15. The device of claim 14 further comprising a DC current control block for minimizing current when the device is operating in the transmit mode of GSM.

16. The device of claim 15 wherein the DC current control block minimizes current when the device is operating in the isolation mode of GSM.

17. The device of claim 13 wherein said switch is comprised of PIN diodes and FET transistors.

18. The device of claim 17 further comprising a DC current control block for minimizing current when the device is operating in the transmit mode of GSM.

19. The device of claim 18 wherein the DC current control block minimizes current when the device is operating in the isolation mode of GSM.

20. The device of claim 13 wherein said switch is comprised of a PIN diode and a shunt transistor array.

21. The device of claim 20 further comprising a DC current control block for minimizing current when the device is operating in the transmit mode of GSM.

22. The device of claim 21 wherein the DC current control block minimizes current when the device is operating in the isolation mode of GSM.

23. The device of claim 13 wherein said switch and said isolation block are mounted on a printed circuit board.

24. The device of claim 13 wherein said switch and said isolation block are mounted as a module on a suitable substrate material.

25. A mobile terminal including a GSM/DAMPS antenna interface device for suppressing spurious signal leakage, said antenna interface having an antenna port, a receive port, and a transmit port, and powered by a limited DC current source, said antenna interface further comprising:
   a switch, for switching between a transmit mode and a receive mode based on controlled input; and
   an isolation block coupled with said switch, that allows said switch to switch to an isolation mode such that any spurious signals in the receive port and the transmit port are suppressed from leaking out of the antenna port.

26. The mobile terminal of claim 25 wherein said switch is comprised of PIN diodes.

27. The mobile terminal of claim 26 wherein said antenna interface further comprises a DC current control block for minimizing current when the mobile terminal is operating in the transmit mode of GSM.

28. The mobile terminal of claim 27 wherein the DC current control block minimizes current when the mobile terminal is operating in the isolation mode of GSM.

29. The mobile terminal of claim 25 wherein said switch is comprised of PIN diodes and FET transistors.

30. The mobile terminal of claim 29 wherein said antenna interface further comprises a DC current control block for minimizing current when the mobile terminal is operating in the transmit mode of GSM.

31. The mobile terminal of claim 30 wherein the DC current control block minimizes current when the mobile terminal is operating in the isolation mode of GSM.

32. The mobile terminal of claim 25 wherein said switch is comprised of a PIN diode and a shunt transistor array.

33. The mobile terminal of claim 32 wherein said antenna interface further comprises a DC current control block for minimizing current when the mobile terminal is operating in the transmit mode of GSM.

34. The mobile terminal of claim 33 wherein the DC current control block minimizes current when the mobile terminal is operating in the isolation mode of GSM.

35. The mobile terminal of claim 25 wherein said switch and said isolation block are mounted on a printed circuit board.

36. The mobile terminal of claim 25 wherein said switch and said isolation block are mounted as a module on a suitable substrate material.

* * * * *